United States Patent [19]
Mills, Jr. et al.

[11] 3,868,238
[45] Feb. 25, 1975

[54] DUST CONTROL SYSTEM FOR BATCH PLANT CHARGING OF TRANSIT MIXERS

[75] Inventors: Albert A. Mills, Jr., Columbus; Norman H. Koerner, Sr., Granville, both of Ohio

[73] Assignee: The Columbus Bin Company, Inc., Columbus, Ohio

[22] Filed: Mar. 29, 1974

[21] Appl. No.: 456,202

[52] U.S. Cl.................. 55/273, 55/283, 55/284, 55/288, 55/302, 55/341, 55/467, 141/93
[51] Int. Cl............................................ B01d 46/04
[58] Field of Search....... 55/273, 96, 283, 284, 287, 55/288, 302, 341, 379, 467; 98/115; 141/93

[56] References Cited
UNITED STATES PATENTS

| 806,648 | 12/1905 | Dickinson | 98/115 R |
|---|---|---|---|
| 1,784,339 | 12/1930 | Clasen et al. | 55/302 |
| 2,862,701 | 12/1958 | McFeaters | 98/115 |
| 3,707,998 | 1/1973 | Dalrymple | 141/93 |
| 3,803,814 | 4/1974 | Parsons, Jr. | 55/287 |
| 3,813,853 | 6/1974 | Anderson | 55/379 |

FOREIGN PATENTS OR APPLICATIONS

| 834,636 | 3/1952 | Germany | 55/287 |
|---|---|---|---|

Primary Examiner—Bernard Nozick
Attorney, Agent, or Firm—Mahoney, Miller & Stebens

[57] ABSTRACT

A dust control system for collecting dust as a transit mixer is charged from a batch plant. It includes a shroud which is moved into cooperation with the inlet of the mixer and a dust-filtering system connected to the shroud. The filtering system includes a pair of filtering chambers, through which the dust is passed for collection during the loading of the mixer and in which the flow is reversed in alternate chambers during cleaning periods.

8 Claims, 10 Drawing Figures

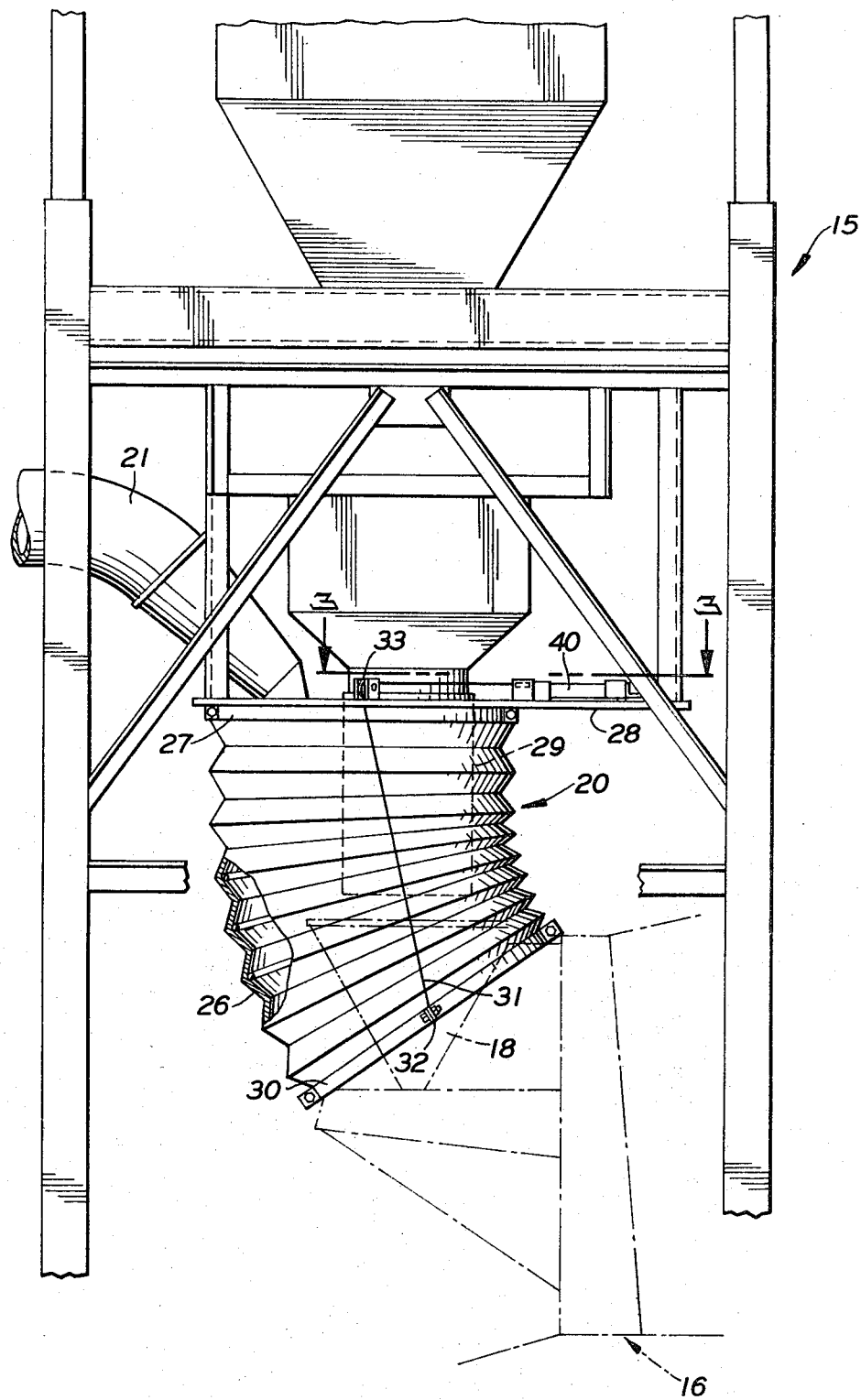

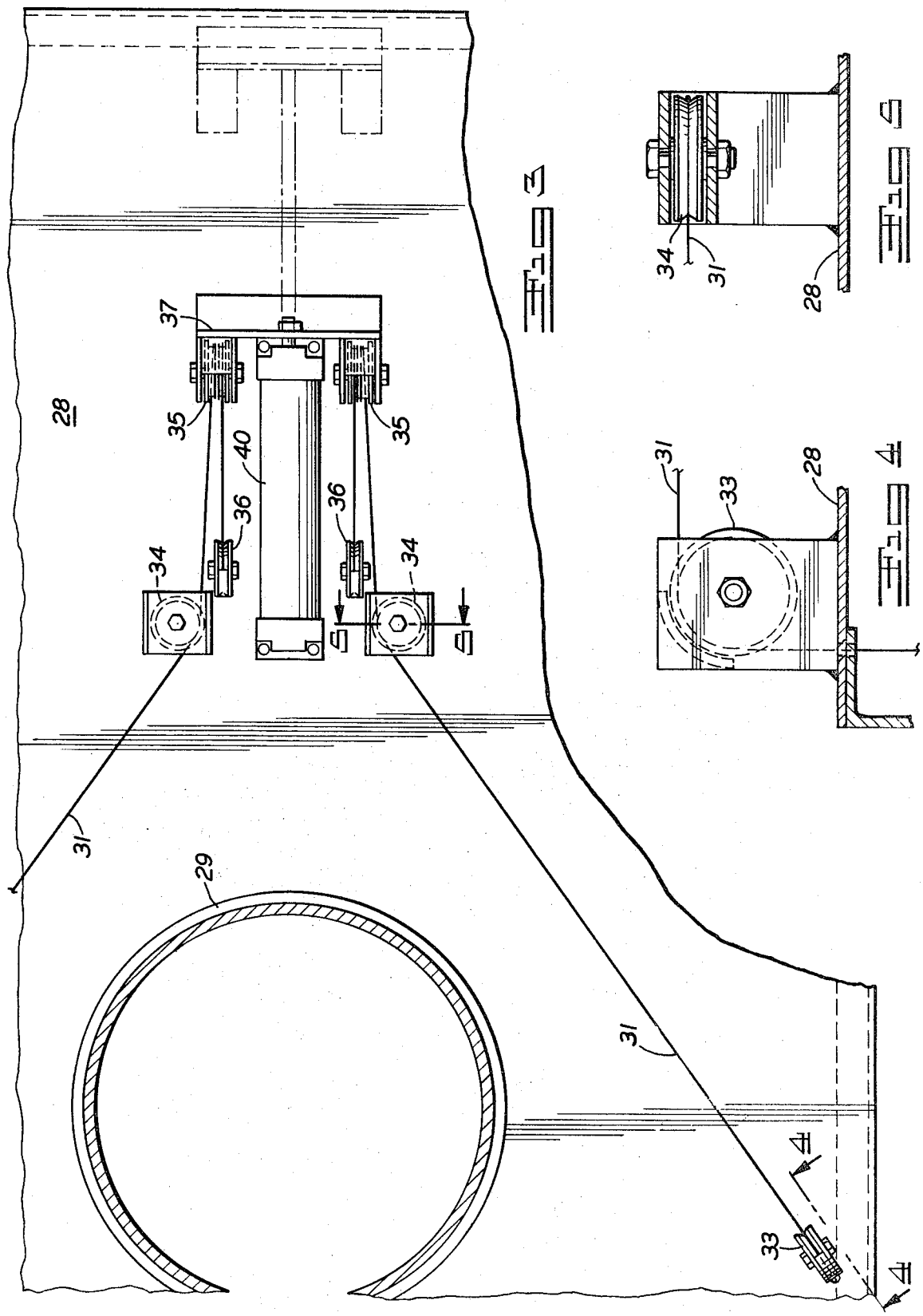

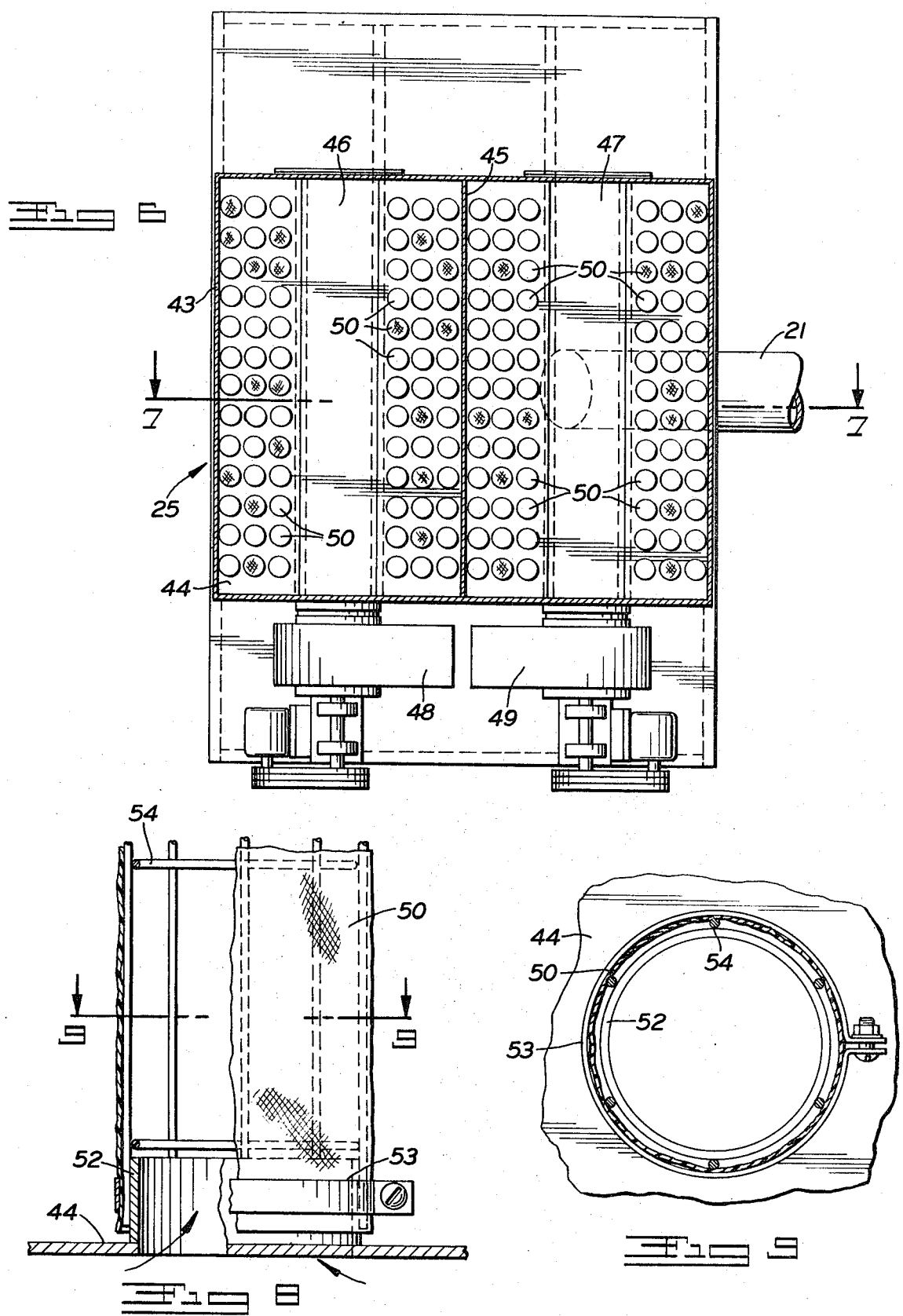

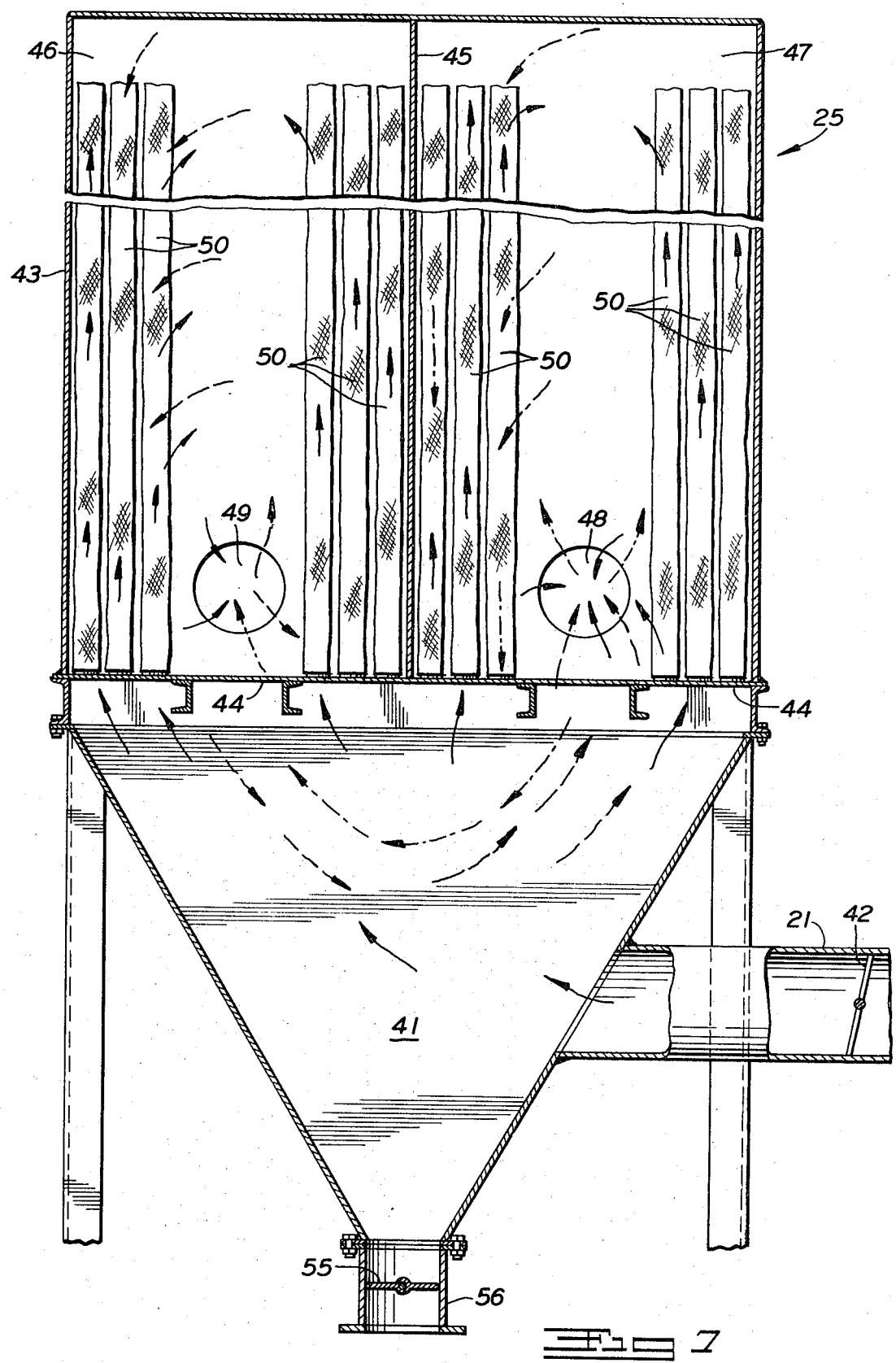

DUST CONTROL SYSTEM FOR BATCH PLANT CHARGING OF TRANSIT MIXERS

BACKGROUND OF THE INVENTION

There have been dust control systems used in the prior art for collecting dust at a batch plant during the charging operation through the upper rear inlet of a transit-mixer. These systems have included a shroud cooperating with the outlet, as the dry-mix materials are charged therein, to collect the dust. The shroud has been connected to a filtering system. Certain difficulties have been characteristic of these prior art systems, such as the complicated nature of the shroud and its positioning system along with alignment of the shroud with the mixer inlet, but especially the structure of the prior art filter system which makes it difficult to clean or remove the accumulated dust from the filter members thereof.

SUMMARY OF THE INVENTION

The present invention overcomes the above-indicated difficulties first by having a shroud which is simple and easy to position in association with the mixer inlet irrespective of the angle of the vehicle relative thereto and secondly by having a filtering system connected to the shroud which not only efficiently collects the dust but especially is so constructed that the filtering members can be automatically and efficiently cleaned of the accumulated dust with less complicated equipment than that which is available in the prior art.

BRIEF DESCRIPTION OF THE DRAWINGS

The best mode contemplated in carrying out this invention is illustrated in the accompanying drawings in which:

FIG. 2 is an enlarged side elevational view, partly broken away, of the shroud structure of this invention.

FIG. 3 is an enlarged horizontal sectional view taken along line 3—3 of FIG. 2.

FIG. 4 is an enlarged vertical sectional view taken along line 4—4 of FIG. 3.

FIG. 5 is an enlarged vertical sectional view taken along line 5—5 of FIG. 3.

FIG. 6 is an enlarged horizontal sectional view taken along line 6—6 of FIG. 1.

FIG. 7 is a vertical sectional view taken along line 7—7 of FIG. 6.

FIG. 8 is a view, partly in vertical section and partly in elevation, showing mounting means for a filter bag.

FIG. 9 is a horizontal sectional view taken along line 9—9 of FIG. 8.

DETAILED DESCRIPTION OF THE INVENTION

Figure 1:
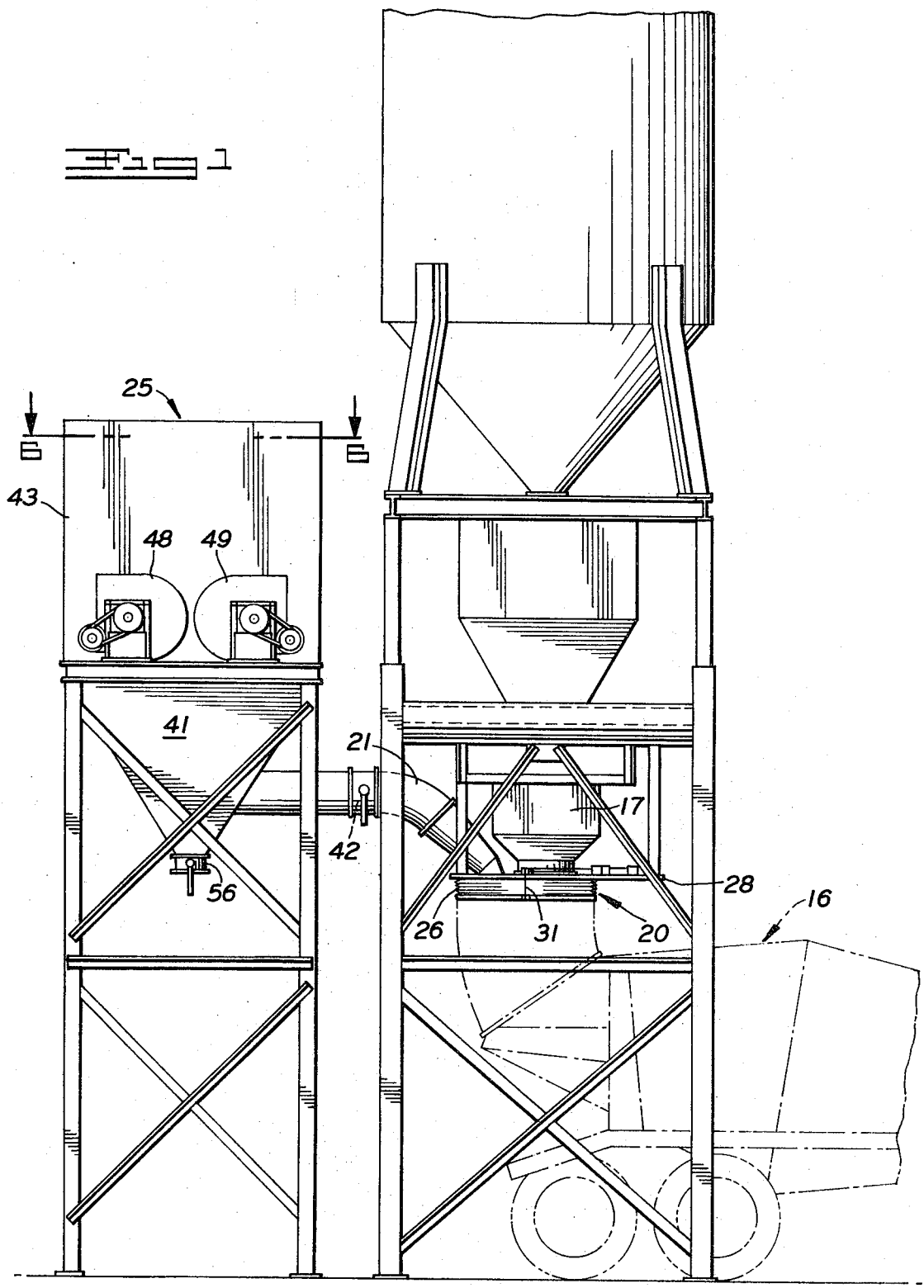
FIG. 1 is a side elevational view of a batch plant having a dust control system connected thereto in accordance with this invention.

With reference to the drawings, in FIG. 1 there is indicated generally the units of the system of this invention which cooperate with a batch plant 15 that supplies dry mix to a transit mixer indicated schematically at 16. The plant 15 charges the mixer 16 by means of depending spout 17 which is connected to the mixer inlet 18 by means of the dust-collecting shroud 20 of this invention. This shroud 20 is also connected to a dust conduit 21 which is connected to the filtering unit 25 of this invention.

The shroud 20 is illustrated best in FIGS. 2 to 5 and is in the form of a flexible tubular sleeve 26 which is made of suitable material, such as plastic or rubber, formed with accordian-folds to facilitate axial extension and retraction. To suspend the sleeve 26, its upper end is secured to a metal ring 27 which is fastened beneath a horizontal support plate 28 of the unit 15. The spout 17 is provided with a throat 29 which projects downwardly through an opening in the plate 28. The lower end of the shroud sleeve 26 has fastened thereto a metal ring 30 by means of which axial extension and retraction of it can be controlled. For this purpose, a pair of cables 31 is connected thereto at diametrically opposed points 32. These cables pass upwardly through the plate 28 vertically about the sheaves 33 and then pass along the upper surface of the plate 28 in converging relationship horizontally about the guide sheaves 34. The cables then pass vertically around the multiple sheaves 35 and in a return direction to the sheaves 36 which are anchored in fixed positions on the plate 28. The multiple sheaves 35 are carried by a crosshead 37 which is reciprocated by means of a cylinder and piston unit 40 fixed to the upper surface of plate 28. In the full-line position of the head 37 in FIG. 3, the cables 31 will be laid out to permit downward extension of the shroud sleeve 26 such as indicated in FIG. 2, whereas in the broken line position of the head 37, the cables will be pulled in so as to fold the sleeve axially upwardly against the lower surface of the support plate 28. Thus, the cable-reeving arrangement actuated by the unit 40 will raise the lower end of the sleeve to an inoperative retracted or folded position or will permit axial extension to a depending operative position by dropping its lower end. In this latter position, the inlet 18 of the mixer may be at any angle it happens to assume relative to the axis of the sleeve when the truck is moved beneath the batch plant unit 10.

The filtering unit 25 is illustrated in detail best in FIGS. 6 to 9. The housing for the unit includes a lower funnel-like inlet section 41 to which the dust inlet conduit 21 is connected. It will be noted that this conduit is provided with a butterfly type valve or damper 42, (FIGS. 7). The housing also includes an upper main housing portion 43 which is of substantially cubical form having a perforated bottom plate 44 suitably supported. The housing portion 43 is provided with an imperforate upright partition 45 which divides the housing portion into two filtering compartments or chambers 46 and 47 of identical size. In one of the sidewalls of the housing portion 43 adjacent the bottom 44, exhaust fans 48 and 49 and cooperating outlets are provided for the respective chambers 46 and 47.

The filtering means in the respective chambers 46 and 47 may take various forms but is indicated as comprising a set of upstanding filter bags 50 provided in each chamber. These filter bags may be of various types of woven cloth, but a polyester sateen weave of 104 × 68 count has been found suitable. The open ends of the tubular bags are disposed lowermost and are mounted over the openings in the plate 44 in the manner indicated in FIGS. 8 and 9. Surrounding each plate opening is an upstanding fixed collar 52 over which the end of a bag is slipped and is clamped thereon by a removable split clamping ring 53. An upstanding wire cage 54 may be secured to the collar 52 as a support over which the bag is slipped and which will support the bag in upright position as indicated.

The bags 50 will collect dust from air which is supplied into the funnel-shaped housing portion 41 by the conduit 21, as will be explained later. When the bags are cleaned, in a manner to be described, the accumulated dust will drop into the portion 41 which is provided with a bottom outlet 56 controlled by a manually-actuated damper or valve 55.

In using this dust collection system, the truck mixer 16 is first moved to position its inlet 18 in cooperation with the throat 29. At this time, the shroud sleeve will be in upwardly-retracted position so as not to interfere with the mixer. When the mixer is properly located, the unit 40 is actuated to extend or lower the shroud until it engages the inlet 18 as indicated in FIG. 2. At this time, the inlet can be any angular position relative to the shroud axis and exact alignment is not required. As the dry mix is charged into the mixer, dust will be created which will be collected by the shroud sleeve 26, conducted through the conduit 21, past the valve 42, now open, and into the lower housing portion 41. As soon as charging of the mixer is started, the fans 48 and 49 are started to draw the dust through the shroud, conduit and housing portion 41 up into both filter chambers 46 and 47. With both fans on, the dust-laden air will be drawn upwardly through the filter bags 50, the dust remaining on the inner surfaces of the bags and the cleaned air being discharged by the fans to the atmosphere. The path of flow of air during charging of the truck mixer is indicated by the full-line arrows in FIG. 7.

After a predetermined period of charging, during which dust accumulates on the bags, it is desirable to reverse the air flow therethrough to clean the bags. This is accomplished in the respective chambers 46 and 47 alternately. To do this, the fans 48 and 49 are alternately on and off and the valve 42 is closed.

Assuming the fan 48 is off and the fan 49 is on, with the valve 42 closed, the air flow will be as indicated by the broken line arrows, as created by actuation of the fan 49 only. Air will be drawn in through the chamber 46, will be from the atmosphere into the chamber 46, will be drawn inwardly through the bag walls, removing the accumulated dust therefrom and causing it to drop down through the bags into the housing portion 41. By the time the air is drawn out through the operating fan 49 to the atmosphere, the heavy accumulated dust particles will have dropped therefrom.

The charging operation is again performed with both fans 48 and 49 turned on the valve 42 opened, and the air flow will be as described before and indicated by the full-line arrows.

After this predetermined period of charging, the valve 42 is closed and the fan 49 is turned off with the fan 48 still operated. This will produce a cleaning action of the bags 50 in the chamber 47. Air flow will be as indicated by the chain-dotted arrows, with the air entering at the fan 49, and the flow created by the operating fan 48. The air will be drawn into the chamber 47, inwardly through the bags 50 therein, removing accumulated dust therefrom and causing it to drop into housing portion 41. Excess air, from which the heavy accumulated dust particles have dropped, will be drawn out to the atmosphere through the fan 48. When sufficient dust accumulates in housing portion 41, valve 55 may be opened to remove it.

Thus the sequence of operations for the filtering system is as follows:

1. Inlet valve 42 is opened and both fans 48 and 49 are operated for predetermined period of collect dust during charging of mixer.
2. Inlet valve 42 is closed, fan 48 is off with fan 49 on for predetermined period to clean bags in chamber 46.
3. Inlet 42 is opened, and both fans 48 and 49 are operated for predetermined period to collect dust during charging of mixer.
4. Inlet valve 42 is closed, fan 49 is off with fan 48 on for predetermined period to clean bags in chamber 47.

Figure 10:
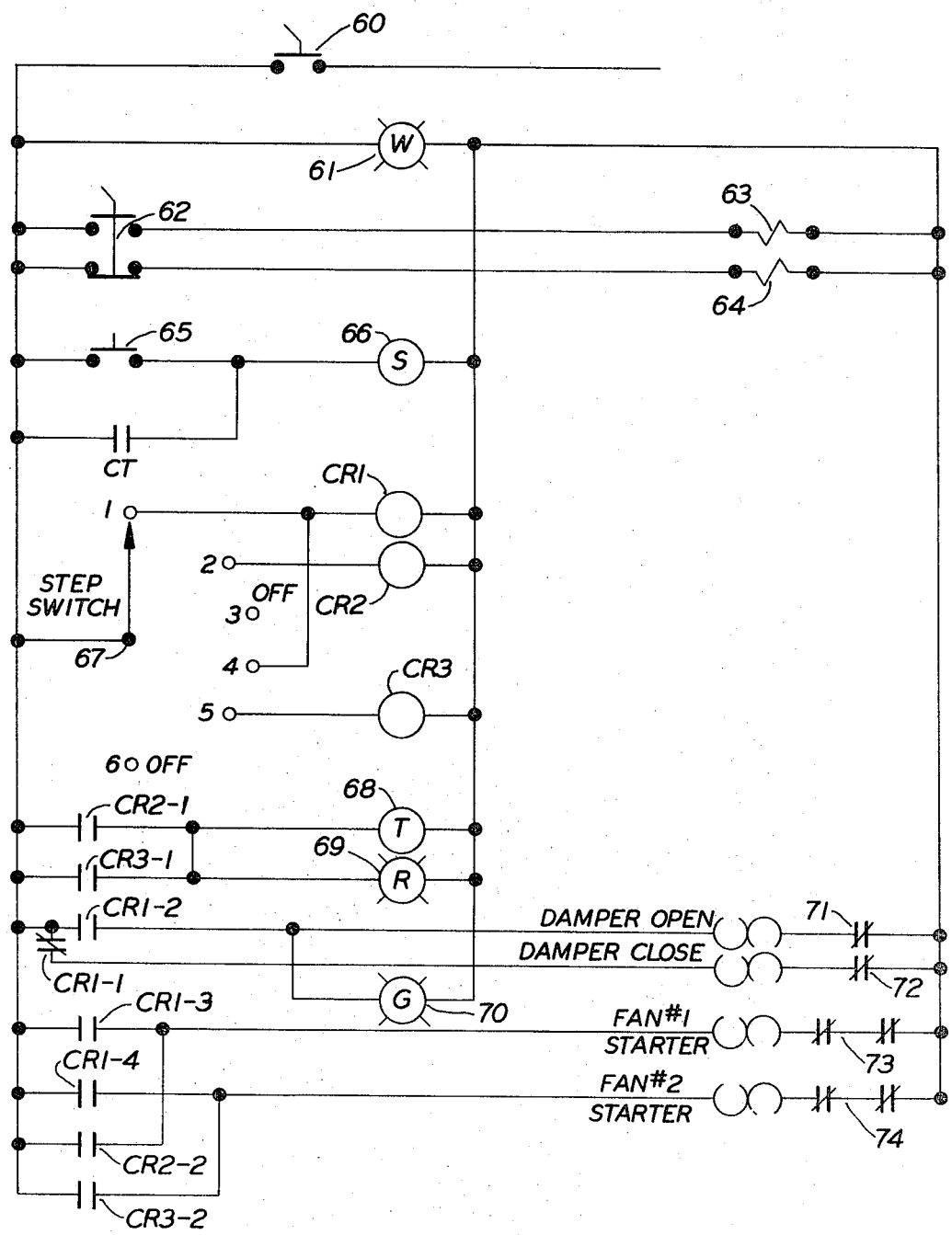
FIG. 10 is a schematic diagram of the control circuit for the system.

The electrical circuit for operation of the shroud 20 and producing the above-indicated sequence of the filtering unit 25 is shown schematically in FIG. 10. The power switch is indicated at 60. A signal light is indicated at 61 to signal when the power is on. A switch is indicated at 62 to control the solenoids 63 and 64 of the unit 40 to produce the extension and retraction of the shroud sleeve 26. Switch 65 also operates a solenoid 66 which controls a stepping switch 67. Stepping switch 67 controls various relays CR1, CR2 and CR3 connected to the various contacts thereof. In the circuit of relay CR2 is a timer 68, in the circuit of the relay CR3 is a cleaning signal light 69 and in the circuit of the relay CR1 is a signal light 70 to indicate when both fans are on. Relay CR1 is also connected in circuit with the damper opening and closing mechanisms 71 and 72 and the fan starters 73 and 74.

Operating sequence of the circuit:

With the step switch 67 having its movable contact in either the number 3 or 6 position, the dust collector will be nonoperating. Operation is initiated by momentarily closing the operate switch 65 which energizes the stepping switch solenoid 66 and results in advancement of the movable contact to the next position.

Assuming that the movable contact is in position 6 and it is desired to remove dust laden air from within the shroud, the operator closes switch 65 thereby energizing solenoid 66 and advances the contact to the illustrated position 1. Prior to this time, a circuit had been completed to the damper close mechanism 72 through a normally closed contact CR1-1 and this damper was placed in a closed position. With the stepping switch contact now in position 1, a relay switch CR1 is energized resulting in opening of its associated contacts CR1-1 and simultaneous closing of its normally open contacts CR1-2 the contacts CR1-2 are connected in circuit with the damper open mechanism 71 and closing of these contacts results in opening of the damper.

Also actuated by energization of relay CR1 are the two normally open contacts CR1-3 and CR1-4. These two contacts are connected in circuit with the respective starter 73 and 74 for the first and second fan motors 48 and 49. Energization of relay CR1 closes these two contacts thereby placing both fans in operation to exhaust the dust laden air from the shroud 26. It will be noted that the operating condition indicator light 69 will be energized and illuminated during this cycle of operation providing visual indication that the damper is open and both fans operating.

When the truck loading operation is completed, the operator again closes the switch 65 to energize the stepping switch solenoid 66 and advance the movable contact 67 to position 2. Relay CR1 is thereby deenergized with each of its four contacts returning to their respective normal position. The green light 70 is extinguished and closing of contacts CR1-1 causes the damper to close. Contact CR1-4 is now open and fan No. 49 is stopped.

With the movable contact in position 2, a second relay switch CR2 is energized and closes its two normally open contacts CR2-1 and CR2-2. Contact CR2-1 is connected in circuit with the timer 68 which is now energized and begins its timing cycle. A second indicator light 69 also connected in circuit with contact CR2-1 is now illuminated to advise that the apparatus is now in a cleaning cycle. The second relay contact CR2-2 is connected in circuit with the first fan starter and fan No. 48 remains in operation although contact CR1-3 is now open.

This cleaning cycle is terminated when the timer T times out (about 30 second time interval) and closes its normally open contacts CT which are connected in parallel with the operate switch 65. Closing of the time contacts CT results in energization of the stepping switch solenoid 66 thereby advancing the movable contact 67 to position 3. The timer 68 is deenergized and its contact CT opens along with the contacts CR2-1 and CR2-2 of the now deenergized relay CR2. The indicator light 69 is now extinguished and neither fan 48 nor 49 will be operating.

A subsequent operating cycle to remove dust laden air from the shroud 26 will follow the same operating sequence outlined with respect to movement of the movable switch contact 67 to position 1 although closing of the operate switch 65 will result in advancement of switch 67 from position 3 to position 4. The damper 42 will open and both fans 48 and 49 will operate. The light 70 will again be illuminated.

Upon completion of the truck-loading operation actuation of switch 65 will advance the movable contact 67 to position 5 and energize relay switch CR3. Apparatus operation will be the same as with energization of relay switch CR2 except that fan No. 49 will remain operating rather than fan No. 48. Relay CR3 has two normally open contacts CR3-1 and CR3-2 that operate in the same manner to energize the timer 68, red light 69 and fan No. 49 termination of the timed cycle by the timer results in advancement of the movable contact 67 of the stepping switch to position 6, the initial starting position for this operation description.

It will be apparent from the above that this invention provides a dust collecting system for collecting dust during charging of dry material into a receptacle inlet. It includes a shroud which is simple and easy to position in association with the inlet and a filtering system which not only effectively collects the dust but is so constructed that the filtering members can be automatically and efficiently cleaned of the accumulated dust with less complicated equipment than that which is available in the prior art.

Having thus described the invention, what is claimed is:

1. In combination with a batch plant for dry-mix material having a discharge outlet through which the material is discharged into the receptacle inlet of a transit vehicle adapted to be positioned in cooperation therewith, a dust-collector shroud connected to the said discharge outlet and adapted to be connected to said receptacle inlet, a filtering unit, and means connecting said shroud to said filtering unit;

said filtering unit including a housing divided into first and second separate and independent filter chambers, said chambers having inlets and outlets and filtering means disposed therebetween;

first and second electrically-driven exhaust fans mounted in cooperation with the respective outlets of the first and second filter chambers;

a common inlet housing chamber connected to said inlets of both filter chambers;

said means connecting said shroud to said filtering unit comprising an inlet conduit connected to said shroud and to said inlet housing chamber and having an electrically-actuated inlet valve for controlling flow of dust-laden air therethrough from said shroud to said inlet chamber; and control means connected to said inlet valve and said fans comprising an electric circuit including means for sequentially driving both of said fans and opening said valve to collect dust from the shroud during discharge of material and alternately driving one of said fans and closing said valve to clean the filter material in the chamber in which the fan is not driven by reversing air flow from the outlet of said chamber into said inlet housing chamber.

2. Apparatus according to claim 1 in which the filter housing comprises an upper cubical portion in which both of said chambers are formed and which have their inlets at their lower ends communicating with said common inlet housing chamber, said chambers being separated by a vertical partition, and one of said exhaust fans and cooperating chamber outlet being in a side wall of each chamber adjacent the lower end thereof.

3. Apparatus according to claim 2 in which the filtering material in each of said chambers comprises vertically disposed filter bags supported in laterally spaced relationship with open lower ends at the lower ends of the respective filter chambers in communication with the said inlet housing chamber, said bags having porous walls.

4. Apparatus according to claim 2 in which said inlet housing chamber tapers toward a lower discharge outlet end, and a material-removal valve at said discharge outlet end.

5. Apparatus according to claim 2 in which said batch plant outlet includes a depending spout and said shroud is in the form of a depending extensible and retractable tube connected to said spout and said inlet conduit, and means for retracting said tube to permit movement of the vehicle receptacle inlet into cooperation with the spout and extending it into dust-collecting position where it encloses the receptacle inlet and the spout.

6. Apparatus according to claim 5 in which the shroud tube is formed of flexible material and is bodily expansible and contractable axially vertically, said tube being fixed at its upper end in cooperation with the spout, said means for retracting and extending the tube comprising cables connected to the lower end thereof, and cable-reeving means for said cables supported on said batch plant.

7. Apparatus according to claim 6 including electric motors for driving said fans and solenoid means for actuating said valve, said electric circuit including a stepping switch connected with said motors and solenoid means for controlling actuation thereof in the stated sequence.

8. Apparatus according to claim 7 including electrically-operated means for said cable-reeving means connected in said circuit, a manual switch connected in said circuit for energizing said electrically-operated means, and a manual switch connected in said circuit with said stepping switch for actuating it.

* * * * *